United States Patent Office 3,592,944
Patented July 13, 1971

3,592,944
BOROHYDRIDE-SULFITE REDUCING AGENT FOR DYEING
Dieter Rudolf Goerrig, Auf der Hardt, Germany, assignor to Ventron Corporation, Beverly, Mass.
No Drawing. Filed May 6, 1968, Ser. No. 727,007
Claims priority, application Germany, May 9, 1967, G 50,049
Int. Cl. C01b 35/00, 6/08; C09b 67/00
U.S. Cl. 252—188    3 Claims

ABSTRACT OF THE DISCLOSURE

A method for producing useful solutions for reducing dyes with the aid of borohydrides is characterized by reacting a solution of alkali metal borohydrides with solutions of sodium salts of sulfur and then reacting this with about 1 mol of $CH_2O$ per mole of $Na_2S_2O_4$, whereupon the solution is mixed with further borohydrides.

---

Dyes, such as vat dyes or sulphur dyes, require reduction in order to be absorbed on textiles.

A particularly useful reducing agent for this purpose is sodium borohydride, when it is sufficiently activated by catalysts or activators.

German Pat. No. 1,036,228 discloses the formation of $Na_2S_2O_4$ from $Na_2S_2O_5$ solutions with the aid of borohydrides according to the equation:

$$BH_4' + 8NaHSO_3 \rightarrow 4Na_2S_2O_4 + BO_2' + 6H_2O$$

$NaSO_2CH_2OH$ag can be obtained by known methods from the $Na_2S_2O_4$ thus produced.

The properties of this product are well known.

German Patent No. 1,041,462 discloses that certain sulphur compounds increase considerably the activity of borohydrides in relation to dyes.

A comprehensive report of the state of the art in this respect is to be found in "Melliand Textilberichte," 1963, Nos. 8 and 9, pages 839–843 and 994–998.

From this known information it can be concluded how a mixture of a borohydride, a sulphite, and an oxymethanesulphinic acid salt will react under determined conditions with a dye.

From other known publications it is clear that $Na_2S_2O_4$ reacts with 2 mols of $CH_2O$ in accordance with $$Na_2S_2O_4 + 2CH_2O + H_2O \rightarrow NaSO_2CH_2OH + NaSO_3CH_2OH$$

From similar publications it is not completely clear how 1 mol of $Na_2S_2O_4$ reacts with 1 mol of $CH_2O$; that is to say it is unclear whether the above reaction is half carried out or whether the actual reaction is similar to:

$$Na_2S_2O_4 + CH_2O + H_2O \rightarrow Na_2SO_2CH_2OH + NaHSO_3$$

but the last assumption appears very probable.

It would accordingly have to be expected that a solution of $Na_2S_2O_4$ produced in accordance with German Pat. No. 1,036,228, when mixed with only one mol of $CH_2O$ to each mol of $Na_2S_2O_4$ and then mixed with NaOH in order to convert the $NaHSO_3$ into $Na_2SO_3$ and then mixed with more $NaBH_4$ and normally with more NaOH, would react in relation to dyes like a similar solution of $NaBH_4$ in the presence of $NaSO_2CH_2OH$, and $Na_2SO_3$, that is to say the activation of $NaBH_4$ by the sulphur compounds, which is described in German Pat. No. 1,041,462, would have to be expected.

It has however been found that a solution which was produced by reacting an alkali metal borohydride in accordance with German Pat. No. 1,036,288 with a solution containing $Me^IHSO_3$, and which was then treated with about 1 mol of $CH_2O$ for each mol of $Na_2S_2O_4$ formed and thereupon mixed with more alkali and more alkali metal boronate, actually reacts substantially differently, in fact more satisfactorily, with dyes than a solution prepared by other means from $NaBH_4$, $NaSO_2CH_2OH$, $Na_2SO_3$, and $NaOH$ Previous attempts to find a complete theoretical explanation for this phenomenon according to the invention are not entirely satisfactory. Nevertheless the fact underlying the invention remains that the reactivity of such specially produced solutions is considerably greater than the activity of a solution obtained by dissolving $NaBH_4$, $NaOH$, $NaSO_2CH_2OH$, and $Na_2SO_3$ in water.

As will be seen more clearly from the examples given below, this advantage takes the form of increased speed of reaction and improved properties of the dyeings obtained. Accordingly, until complete theoretical understanding is reached, the basic principle of the invention must be summarised as follows:

Instead of dissolving known chemical compounds, such as $NaSO_2CH_2OH$, $Na_2SO_3$, $NaBH_4$, and $NaOH$ in water, it is proposed according to the invention to produce a more effective solution, which nevertheless cannot be theoretically distinguished therefrom by knowledge gained to date, by:

(a) making a solution containing $Na_2S_2O_4$ by reacting compounds such as $NaHSO_3$ with alkali metal borohydrides in accordance with German Pat. No. 1,036,228;

(b) reacting this solution with about 1 mol of $CH_2O$ to each mol of $Na_2S_2O_4$, and then (c) mixing the same with an excess of NaOH and further alkali metal borohydride, and using the resulting solution as a particularly effective special product in accordance with German Pat. No. 1,041,462 for reducing reducible dyes, such as vat dyes or sulphur dyes.

Further details can be seen from the following examples, which show some of the possible forms of application of the invention without being able to list all such forms and thus naturally without restricting the object of the invention.

EXAMPLE 1

For the following experiments use was made of a pigment padding, dried on the hot flue, on a bleached, mercerised cotton twill of a weight of 220 grams per square metre, this padding having been produced with 8 weight percent of vat blue 6 (C.I. 69 825/6) (calculated as single paste). These paddings were in each case developed by the pad-steam method in the following steps:

Impregnation with the solution of chemicals described below at about 25° C., pressing off to a liquid absorption of 60%, steaming with a steaming time of 30 seconds, rinsing, oxidising, rinsing, soaping, rinsing, and drying.

(a) (First comparison example.) The above padding is impregnated with a solution of 0.8 gram per litre of $NaBH_4$
0.56 gram per liter of $Na_2Ni(CN)_4$
7.1 grams per litre of $NaSO_2CH_2OH \cdot 2H_2O$ (=0.046 mol per litre)
12.7 grams per litre of NaOH and developed as described above. A result is obtained which in respect of all properties corresponds to the present state of the art.

(b) (Second comparison example.) The above padding is impregnated with a solution of 0.8 gram per litre of $NaBH_4$
0.56 gram per liter of $Na_2Ni(CN)_4$
7.1 grams per litre of $NaSO_2CH_2OH \cdot 2H_2O$ (=0.046 mol per litre)

5.8 grams per litre of $Na_2SO_3$ (=0.046 mol per litre)
12.7 grams per litre of NaOH and developed as described above. The same result as in (a) above is obtained.

(c) (Example partly according to the invention.) 8.0 grams of $Na_2S_2O_4$ (=0.046 mol) is reacted in 200 ml. of water with 0.046 mol of dissolved $CH_2O$ and then with 1.84 grams of NaOH (=0.046 mol), and this solution is used, with the addition of 0.8 gram of $NaBH_4$, 0.56 gram of $Na_2Ni(CN)_4$ and 12.7 grams of NaOH, to make 1 litre of a solution of chemicals (that is to say in theory formally the same solution as in (b)).

The above padding is developed with this solution under the same conditions as in (a) and (b).

A dyeing is obtained which has a depth of colour 15–17% greater and is considerably brighter in shade than the above dyeings according to (a) and (b). Fastness properties are equally good.

(d) (Example entirely according to the invention.) 8.75 grams of $Na_2S_2O_5$ (=0.046 mol) are reacted in 200 ml. of water with 0.437 gram of $NaBH_4$ (=0.0115 mol), 0.046 mol of dissolved $CH_2O$ is added, followed by 1.84 grams of NaOH (=0.046 mol), and with the addition of 0.8 gram of $NaBH_4$, 0.56 gram of $Na_2Ni(CN)_4$ and 12.7 grams of NaOH there is prepared 1 litre of a solution of chemicals (that is to say in theory formally the same solution as in (b)).

The above padding is developed therewith under the same conditions in (a) to (c). A dyeing having a 28–31% greater depth of colour than in (a) and (b) is obtained, while in addition the shade is incomparably brighter.

All fastness properties are excellent.

EXAMPLE 2

On a mercerised, bleached, closely woven poplin of a weight of 185 grams per square metre there is produced a pigment padding, dried on the hot flue, of 2.5 weight percent of vat green 3 (C.I. 69 500/1) plus 5.0 weight percent of vat green 8 (C.I. 71 050) plus 2.5 weight percent of vat black 25 (C.I. 69 525), that is to say a total of 10 weight percent of dye (calculated as single paste).

This padding is developed in each case by the padsteam method in the following steps: impregnation with the chemical solutions described below, pressing-off to 60% liquid absorption, steaming with a steaming time of 30 seconds, rinsing, oxidising, rinsing, soaping, rinsing, and drying.

(a) (First comparison example.) The above padding is impregnated with a solution of 6.8 grams per liter of $NaBH_4$
0.56 gram per litre of $Na_2Ni(CN)_4$
7.1 grams per litre of $NaSO_2CH_2OH \cdot 2H_2O$ (=0.046 mol per litre)
12.7 grams per litre of NaOH and treated as described above.

A dyeing is obtained which does not correspond to the state of the art, but which is 25–30% weaker in colour. In addition, the fastness properties are unsatisfactory, this applying particularly to fastness to wet rubbing. (With this combination of chemicals the amounts would have had to be increased by 50% in order to obtain satisfactory dyeing.)

(b) (Second comparison example). The above padding is padded with 0.8 gram per litre of $NaBH_4$
0.56 gram per litre of $Na_2Ni(CN)_4$
7.1 grams per litre of $NaSO_2CH_2OH \cdot 2H_2O$ (=0.046 mol per litre)
5.8 grams per litre of $Na_2SO_3$ (=0.046 mol per litre)
12.7 grams per litre of NaOH and treated as above. No noteworthy differences from (a) are found.

(c) (Example partly according to the invention). 8.0 grams per litre of $Na_2S_2O_4$ (=0.046 mol) are reacted in 200 ml. of $H_2O$ with 0.046 mol of dissolved $CH_2O$ and then with 1.84 (=0.046 mol) of NaOH. 1 litre of the reduction solution is prepared by adding 0.8 gram of $NaBH_4$ and 0.56 gram of $Na_2Ni(CN)_4$ and 12.7 grams of NaOH. (That is to say formally the same as in (b).)

This solution of chemicals is used for working exactly as above.

A dyeing is obtained which, although markedly better than (a) or (b), is nevertheless inferior to good standard dyeings according to the present state of the art, that is to say dyeings with substantially larger amounts of reducing agent, being inferior by 15–20% in respect of colour depth, and by about 20% in respect of fastness properties, particularly wet rubbing fastness.

(d) (Example entirely according to the invention.) 8.75 grams of $Na_2S_2O_5$ (=0.046 mol) are reacted in 200 ml. of $H_2O$ with 0.437 gram of $NaBH_4$ (=0.0115 mol), 0.046 mol of dissolved $CH_2O$ is then added, and thereupon the product is mixed with 1.84 grams (=0.046 mol) of NaOH.

By adding 0.8 gram of $NaBH_4$, 0.56 gram of $$Na_2Ni(CN)_4$$

and 12.7 grams of NaOH, 1 litre of reducing solution is produced, which should thus in theory formally be the same as in (b) above. This solution is used to work exactly as in (a) to (c) above.

A dyeing is obtained which is superior to known standard results by 5–10% in respect of depth of colour, considerably superior in shade in appearance, and markedly superior in fastness properties, particularly in fastness to wet processing. As compared with the result obtained in (b), there is not only a 40% improvement in respect of dye yield but also a very considerably better quality.

I claim:

1. A method of producing useful solutions for reducing dyes with the aid of borohydrides characterized in that in a first step a solution of alkali metal borohydrides is reacted with solutions of sodium salts of sulphur in amounts at a ratio of about 1 to 20 to obtain $Na_2S_2O_4$ and in a second step the resultant solution reacted with about 1 mol of $CH_2O$ per mol of $Na_2S_2O_4$, whereupon in a third step the solution is mixed further $NaBH_4$ in an amount about twice as great as in the first step.

2. The method of claim 1 wherein the sodium salt is $NaHSO_3$.

3. The method of claim 1 wherein the relative proportions used in the three steps include, in the first step about 8.75 grams of $Na_2S_2O_5$ are reacted in 200 ml. of water with about 0.437 gram $NaBH_4$, in the second step 0.046 mol of dissolved $CH_2O$ is added, about 1.84 grams of NaOH is then added, and in the third step about 0.8 gram of $NaBH_4$ and about 0.56 gram of $Na_2Ni(CN)_4$ and about 12.7 grams of NaOH are added.

References Cited

UNITED STATES PATENTS

| 3,000,688 | 9/1961 | Schubert | 8—34 |
| 3,118,724 | 1/1964 | Goerrig et al. | 8—34 |
| 3,273,955 | 9/1966 | Goerrig et al. | 8—34 |

FOREIGN PATENTS

| 1,174,797 | 12/1969 | Great Britain | 8—34 |

RICHARD D. LOVERING, Primary Examiner

I. GLUCK, Assistant Examiner

U.S. Cl. X.R.

8—34, 101; 23—358, 59, 149; 252—102